United States Patent
Nair et al.

(10) Patent No.: US 10,234,832 B2
(45) Date of Patent: Mar. 19, 2019

(54) SYSTEM FOR OPTIMIZING CONTROL DEVICES FOR A SPACE ENVIRONMENT

(71) Applicant: Honeywell International Inc., Morristown, NJ (US)

(72) Inventors: Ajay Nair, Bangalore (IN); Wei Hua, Acton, MA (US); Upender Paravastu, Bangalore (IN); Indrajeet Tukaram Sutar, Hadapsar Pune (IN); Robert Klamka, Westford, MA (US)

(73) Assignee: Honeywell International Inc., Morris Plains, NJ (US)

( * ) Notice: Subject to any disclaimer, the term of this patent is extended or adjusted under 35 U.S.C. 154(b) by 457 days.

(21) Appl. No.: 14/849,430

(22) Filed: Sep. 9, 2015

(65) Prior Publication Data
US 2017/0068256 A1    Mar. 9, 2017

(51) Int. Cl.
*G05B 13/02*    (2006.01)
*G05D 7/06*    (2006.01)

(52) U.S. Cl.
CPC ......... *G05B 13/021* (2013.01); *G05D 7/0623* (2013.01)

(58) Field of Classification Search
CPC ...... G05D 7/06; G05D 7/0635; G05D 7/0623; G05B 13/02; G05B 13/021; H05K 7/20; H05K 7/202; F24F 3/161; F24F 11/745; F24F 11/75; F24F 11/755; G24F 11/74
USPC .......................... 700/282, 276, 299, 300, 304
See application file for complete search history.

(56) References Cited

U.S. PATENT DOCUMENTS

| | | | |
|---|---|---|---|
| 5,576,946 A | 11/1996 | Bender et al. | |
| 6,006,142 A * | 12/1999 | Seem | F24F 11/30 700/276 |
| 6,549,826 B1 * | 4/2003 | Pouchak | G05B 13/021 700/275 |
| 7,002,702 B1 | 2/2006 | Machida | |
| 7,636,613 B2 * | 12/2009 | Borah | G05B 9/02 700/27 |
| 8,442,694 B2 * | 5/2013 | Jang | F24F 11/006 236/47 |
| 8,694,174 B2 * | 4/2014 | Nishino | F24F 11/70 700/291 |
| 8,724,481 B2 | 5/2014 | Sasaki et al. | |
| 8,850,345 B1 | 9/2014 | Smith | |
| 2008/0161976 A1 * | 7/2008 | Stanimirovic | F24F 11/30 700/276 |

(Continued)

OTHER PUBLICATIONS

Parker, Sporlan, "Case Controller, Supermarket Control Solutions," 44 pages, 2013.

(Continued)

*Primary Examiner* — Tan T. Nguyen
(74) *Attorney, Agent, or Firm* — Seager, Tufte & Wickhem, LLP

(57) ABSTRACT

The disclosure reveals a system for optimizing control devices in a clean room environment with intelligent flow curve tools. The system may incorporate a controller and one or more valves for airflow control in a space, connected to the controller. The controller may incorporate a user interface that has a display and a control mechanism. The controller may contain one or more airflow tables corresponding to the one or more valves, respectively. Also, the controller may have a curve tool that can provide an airflow table on the display in one or more formats.

19 Claims, 17 Drawing Sheets

(56) References Cited

U.S. PATENT DOCUMENTS

| | | | | |
|---|---|---|---|---|
| 2008/0188173 | A1* | 8/2008 | Chen | F24F 11/77 454/239 |
| 2008/0277486 | A1* | 11/2008 | Seem | H04L 67/125 236/49.3 |
| 2008/0288193 | A1* | 11/2008 | Claassen | H05K 7/20836 702/61 |
| 2010/0070085 | A1* | 3/2010 | Harrod | G05B 19/042 700/276 |
| 2010/0076606 | A1* | 3/2010 | Gatley | F04D 27/004 700/276 |
| 2010/0245103 | A1* | 9/2010 | Plaisted | F24D 11/003 340/657 |
| 2010/0256821 | A1* | 10/2010 | Jeung | G05B 15/02 700/276 |
| 2011/0093493 | A1 | 4/2011 | Nair et al. | |
| 2012/0078438 | A1* | 3/2012 | Navas | F24F 11/0001 700/300 |
| 2013/0035794 | A1* | 2/2013 | Imani | F24F 11/0009 700/276 |
| 2013/0178985 | A1* | 7/2013 | Lombard | G05D 23/1904 700/276 |
| 2013/0190933 | A1* | 7/2013 | DeAngelis | F24F 3/1607 700/282 |
| 2014/0222241 | A1* | 8/2014 | Ols | G05B 15/02 700/299 |
| 2014/0277756 | A1* | 9/2014 | Bruce | G05D 22/02 700/276 |
| 2015/0211760 | A1* | 7/2015 | Wang | F24F 11/30 700/276 |
| 2015/0330397 | A1* | 11/2015 | Alshinnawi | F04D 27/001 700/282 |
| 2016/0085248 | A1* | 3/2016 | Gordon | G05D 23/1917 700/276 |
| 2016/0234971 | A1* | 8/2016 | Shelnutt | H05K 7/20836 |

OTHER PUBLICATIONS

Phoenix Controls Corporation, "Lab Verification Tool User's Guide," 35 pages, 2008.

* cited by examiner

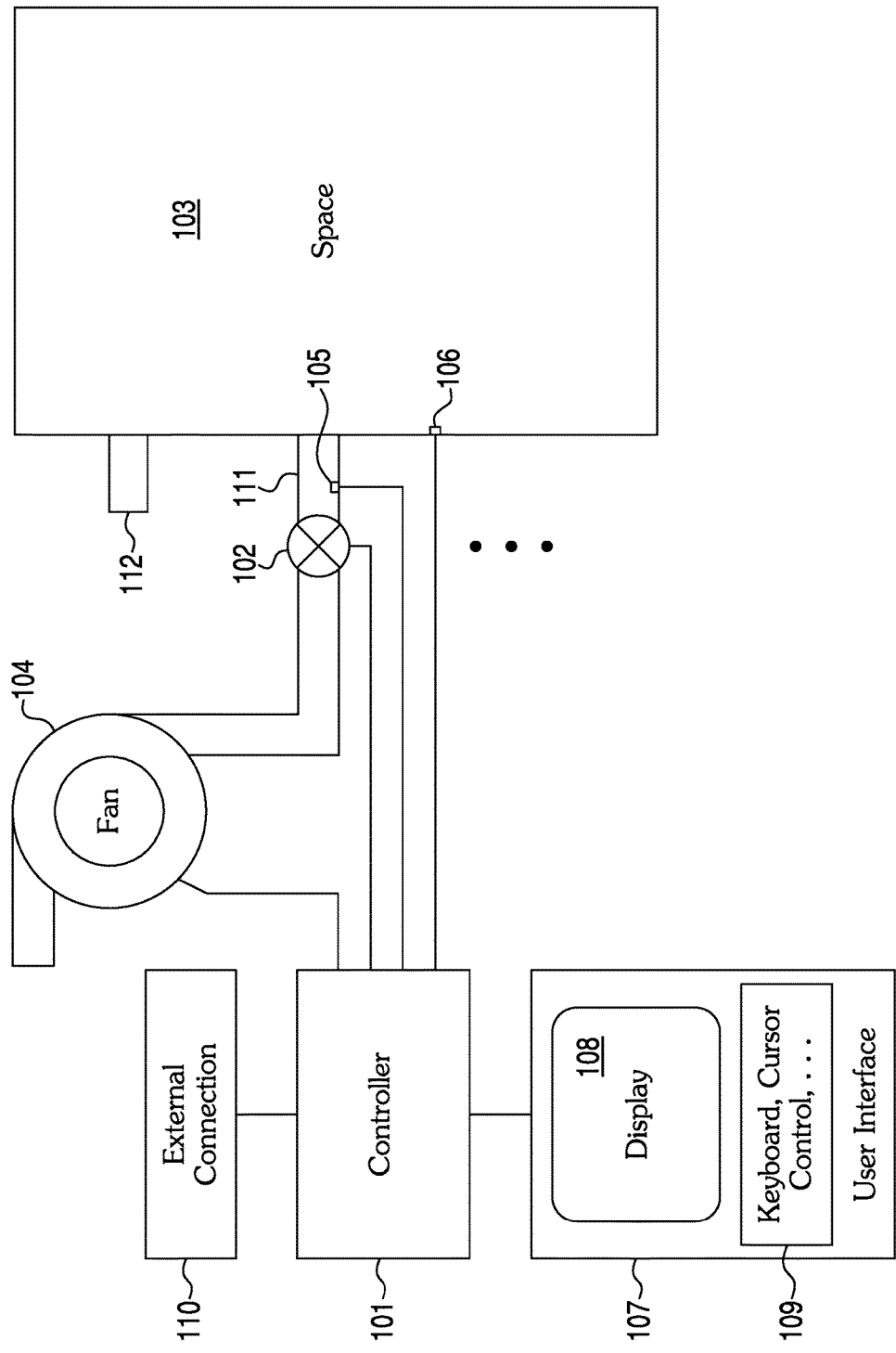

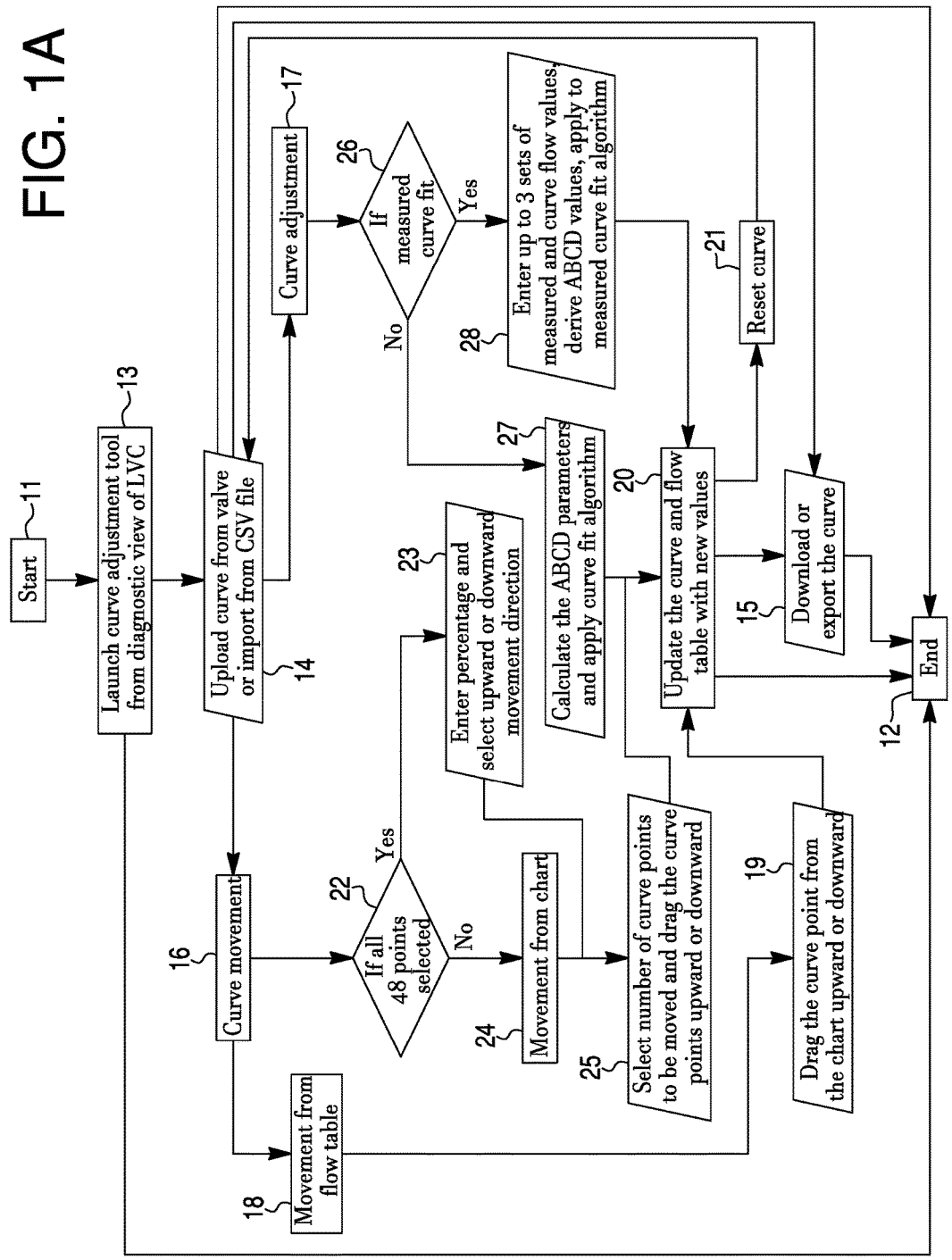

FIG. 5

Flow Table before Change

| Point | Vpot | L/s | Change in L/s |
|---|---|---|---|
| 1 | 0.383 | 41.0 | |
| 2 | 0.41 | 43.0 | |
| 3 | 0.442 | 46.0 | |
| 4 | 0.474 | 50.0 | |
| 5 | 0.503 | 53.0 | |
| 6 | 0.532 | 57.0 | |
| 7 | 0.563 | 60.0 | |
| 8 | 0.596 | 64.0 | |
| 9 | 0.623 | 67.0 | |
| 10 | 0.653 | 72.0 | |
| 11 | 0.679 | 76.0 | |
| 12 | 0.712 | 80.0 | |
| 13 | 0.743 | 84.0 | |
| 14 | 0.776 | 91.0 | |
| 15 | 0.803 | 95.0 | |
| 16 | 0.832 | 101.0 | |
| 17 | 0.864 | 108.0 | |
| 18 | 0.893 | 116.0 | |
| 19 | 0.922 | 123.0 | |
| 20 | 0.954 | 131.0 | |
| 21 | 0.983 | 138.0 | |
| 22 | 1.012 | 150.0 | |

Flow Table after Change

| Point | Vpot | L/s | Change in L/s |
|---|---|---|---|
| 27 | 1.162 | 210.365 | 1.63% (3.365) |
| 28 | 1.194 | 226.22 | 3.77% (8.22) |
| 29 | 1.223 | 241.622 | 4.15% (9.622) |
| 30 | 1.256 | 260.417 | 3.75% (9.417) |
| 31 | 1.282 | 276.228 | 3.85% (10.228) |
| 32 | 1.314 | 296.97 | 2.4% (6.97) |
| 33 | 1.344 | 317.765 | 1.85% (5.765) |
| 34 | 1.377 | 342.228 | 1.85% (6.228) |
| 35 | 1.401 | 361.113 | -2.4% (-8.887) |
| 36 | 1.434 | 388.653 | -4.51% (-18.347) |
| 37 | 1.46 | 411.684 | -5.58% (-24.316) |
| 38 | 1.493 | 442.679 | -4.39% (-20.321) |
| 39 | 1.526 | 475.72 | -4.47% (-22.28) |
| 40 | 1.554 | 505.416 | -2.99% (-15.584) |
| 41 | 1.582 | 536.684 | -3.13% (-17.316) |
| 42 | 1.611 | 570.768 | -3.75% (-22.232) |
| 43 | 1.644 | 611.705 | -1.5% (-9.295) |
| 44 | 1.674 | 650.945 | -1.52% (-10.055) |
| 45 | 1.704 | 692.143 | 1.64% (11.143) |
| 46 | 1.733 | 733.844 | 1.5% (10.844) |
| 47 | 1.763 | 778.93 | 5.4% (39.93) |
| 48 | 1.792 | 824.392 | 4.35% (34.392) |

FIG. 15

$$y = 10^{ax^3+bx^2+cx+d}$$
$$log(y) = ax^3+bx^2+cx+d$$
where $y = CFM$ and $x = Vpot$

SYSTEM FOR OPTIMIZING CONTROL DEVICES FOR A SPACE ENVIRONMENT

BACKGROUND

The present disclosure pertains to control systems and particularly to optimizing control systems.

SUMMARY

The disclosure reveals a system for optimizing control devices in a clean room environment with intelligent flow curve tools. The system may incorporate a controller and one or more valves for airflow control in a space, connected to the controller. The controller may incorporate a user interface that has a display and a control mechanism. The controller may contain one or more airflow tables corresponding to the one or more valves, respectively. Also, the controller may have a curve tool that can provide an airflow table on the display in one or more formats.

BRIEF DESCRIPTION OF THE DRAWING

FIG. 1 is a diagram of an apparatus layout for the present system;

FIG. 1a is a diagram of a flow diagram for a curve adjustment tool;

FIG. 5 is a diagram of a screen of tables of data corresponding to the original and current airflow curves;

FIG. 15 is a diagram of a 3rd degree best polynomial curve fit equation; and

DESCRIPTION

Figure 2:
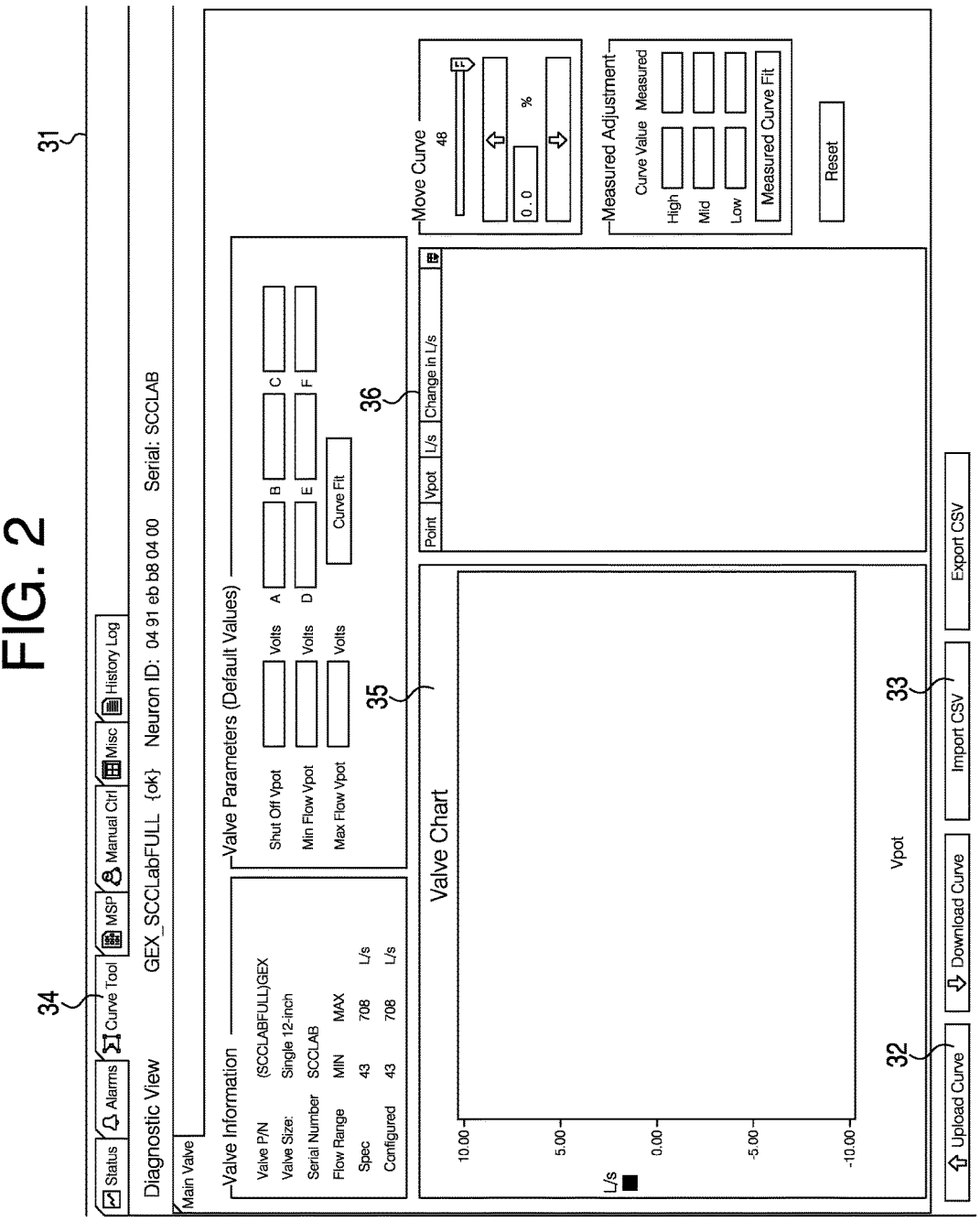
FIG. 2 is a diagram of a screen for a valve data chart and table.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

FIG. 1 is a diagram of an apparatus layout that may implement the present system. A controller 101 may be connected to one or more airflow valves 102 that can control airflow via a port 111 to or from a space 103. Space 103 may be a clean room environment or other volume. A fan 104 may provide airflow to one or more valves 102. Airflow into space 103 may be controlled via a connection of one or more valves 102 to controller 101. Fan 104 may be connected to controller 101 for possible control of the fan. A sensor 105 may be situated near valve 102 to detect an amount of airflow through valve 102 to or from space 103. Sensor 105 may detect and measure other parameters. A sensor 106 may measure temperature in space 103. A cooling mechanism and a heating mechanism may be associated with fan 104 and controller 101 for temperature control of airflow of the one or more valves 102 and of space 103. Sensor 106 may detect and measure other parameters. There may be additional sensors 105 corresponding to additional valves 102. Sensors 05 and 106 may be connected to controller 101. A user interface 107 may be connected to controller 101. User interface 107 may incorporate a display 108 and a user control mechanism 109, such as a keyboard, cursor control, touch screen, and other items to aid a user's interfacing and control of controller 101 and display 108. Display may show the screens noted herein. Controller 101 may have an external connection 110 for receiving inputs such as software, providing outputs such as airflow data, and so forth. Connection 110 may be to another device, the web, and so on. A port 112 may be attached to space 103 for exhaust from or input to the space.

Controller 101 may contain a curve adjustment tool. FIG. 1a is a flow diagram for the curve adjustment tool. From a start at symbol 11, the curve adjustment tool from a diagnostic view of LVC may be launched at symbol 13. The approach may end at symbol 12 or proceed onto symbol 14 where a curve may be uploaded from a valve or imported from a CSV file. Several routes may be taken from symbol 14. The approach may be ended at symbol 12, or go onto symbol 15 where the curve may be downloaded or exported and then the process may be ended at symbol 12.

Several other process routes may be taken after symbol 14, which are a curve movement at symbol 16 and a curve adjustment at symbol 17. After the curve movement, there may be movement from a flow table at symbol 18. A curve point may be dragged from the chart upward or downward at symbol 19. Then the curve and flow table may be updated with new values at symbol 20. Several routes after symbol 20 may incorporate going to the end at symbol 12, downloading or exporting the curve at symbol 15, or resetting the curve at symbol 21. After symbol 15, the process may be ended at symbol 12. After symbol 21, the process may return to symbol 14.

After symbol 16 for curve movement, a question of whether all 48 points, as an example, are selected may be asked at symbol 22. If an answer is yes, then a percentage may be entered and an upward or downward direction may be selected at symbol. If the answer is no, then a movement from the chart may be effected at symbol 24. After symbol 23 or symbol 24, the process may continue on to symbol 25 where a number of curve points may be selected to be moved, and dragged upward or downward. After symbol 25, at symbol 20, the curve and flow table may be updated with new values. After the update at symbol 20, the curve may be downloaded or exported at symbol 15, reset at symbol 21, or the process may end at symbol 12.

After curve adjustment at symbol 17, a question of whether there is a measured curve fit at symbol 26. If an answer is no, then ABCD parameters may be calculated and a curve fit algorithm may be applied at symbol 27. Then the curve and flow table may be updated with new valves. If the answer is yes, then up to three sets of measured curve flow values may be entered, ABCD values may derived, and applied to a measured curve fit algorithm at symbol 28. Then the curve and flow table may be updated with new valves at symbol 20.

After symbol 20, the curve may be reset at symbol 21, downloaded or exported at symbol 15, or the process may end at symbol 12.

The Tridium Niagara™ AX Framework may be a base software application to develop a flow management view which allows users to view the airflow table for the one or more valves. This may be easily used to test airflow ranges and values as well as to edit values in the airflow table. The Tridium Niagara™ AX Framework may be installed in controller 101.

Two formats provided for viewing airflow tables may be a grid and graph. The values in the table may vary depending on whether the user selects US or SI units. The curve tool may allow one to view the airflow table for the values. The tool may help to test airflow ranges and values, as well as edit values in the airflow table. Grid flow table values may range from the lowest to the highest flow settings for a valve. If the values are uploaded from a valve, for instance, 48 values may displayed. If uploaded from a file, 8 or 48 values may be displayed depending on the file content. 8 Values may be interpolated to 48 values. Celeris™ values, for example, may be calibrated to 48 points in the factory and thus the airflow table would need to match so that the valves work properly.

A graph format may plot flow table values into a graph. This may allow viewing the airflow plot to determine whether it is an even curve. If not, adjustments may be made to smoothen the curve as described below. Also, a user may have the flexibility of uploading a CSV file to test an airflow table with different settings on a valve.

Initial loading of the curve tool of selection 34 may be shown in screen 31 of a diagram of FIG. 2. If the device is online, a technician may perform "Upload Curve" at button 32 which can upload all 48 points from a specific device. If required, a technician may also get the data from the CSV file at button 33. Once uploaded from an online device, the data may be shown in valve chart 35 and table 36 of screen 31.

Figure 3:
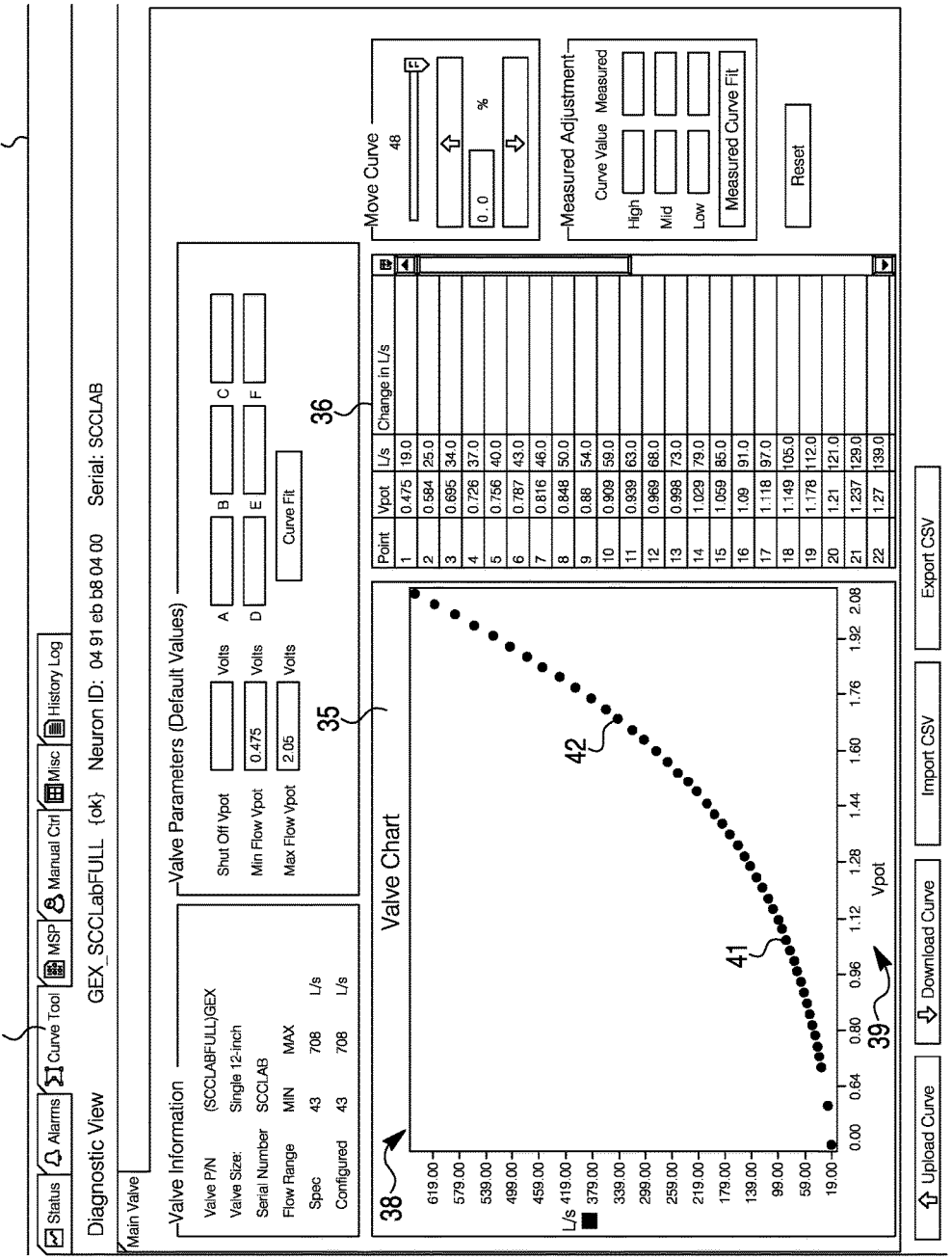
FIG. 3 is a diagram of screen showing an uploaded airflow curve.

FIG. 3 is a diagram of screen 31 showing an airflow curve having been uploaded successfully. The flow curve may show flow on a y-axis 38 and Vpot on an x-axis 39. Vpot may be a valve potentiometer signal representing the actual valve flow.

Chart 35 may contain an original curve 41 and a current curve 42. Original curve 41 may show the curve uploaded from a valve or imported from a CSV file. Chart 35 may remain unchanged and show the original state of curve 41 as compared to a current curve 42 which can get changed after user operations, such as a curve fit, a measured curve fit, upward-downward curve point movements, and so on.

Figure 4:
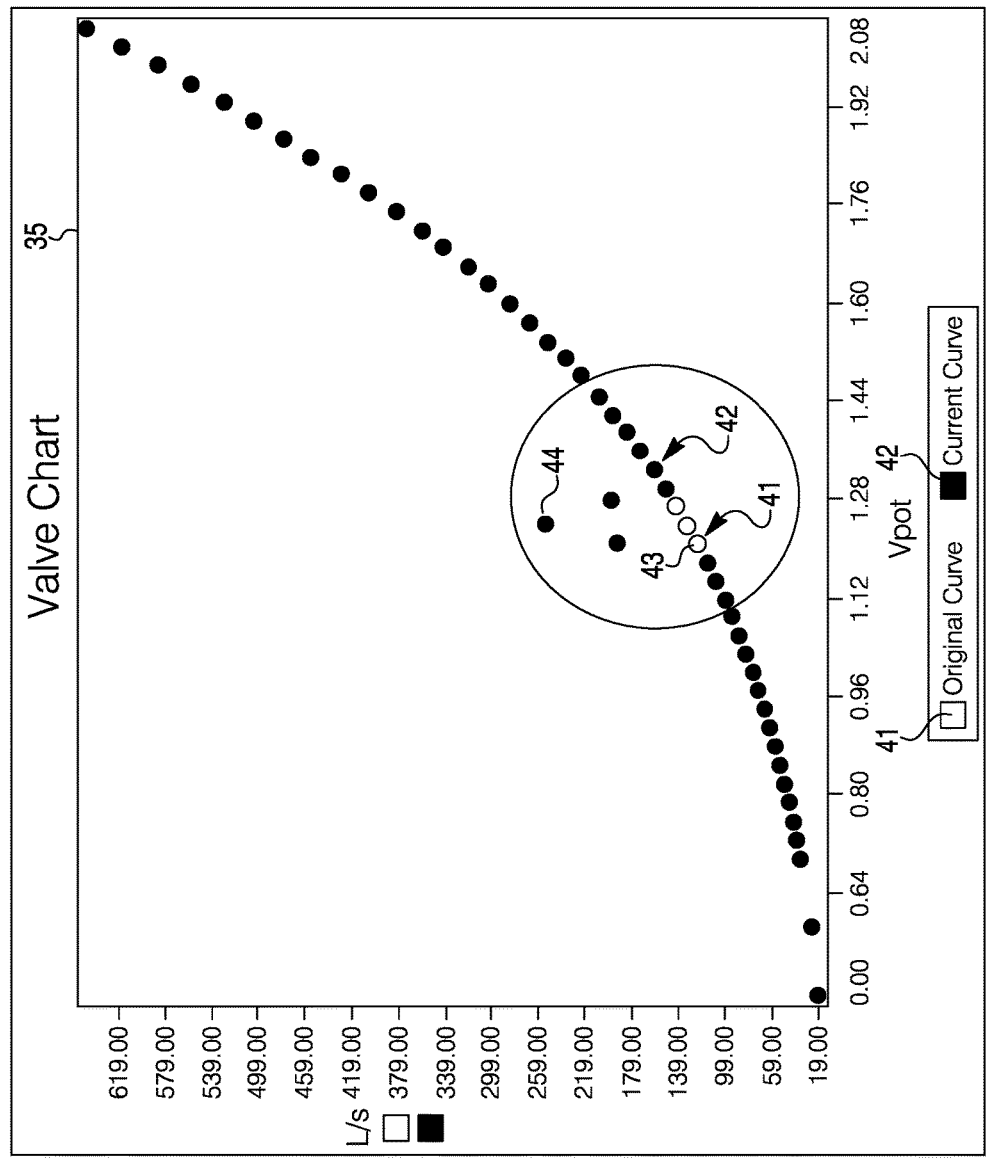
FIG. 4 is a diagram of a screen with a valve chart showing original and current airflow curves.

In FIG. 4, curve 41 of valve chart 35 may be shown as a watermarked curve with points 43 of a light color. Current curve 42 may be equal to or overlap original curve 41 when a user uploads the curve from a valve or CSV file. Current curve 42 may show the current position of the curve points after user operations such as curve fit, measured curve fit, upward-downward curve point movements, and so on. The current points 44 of curve 42 may be shown as a highlighted curve of a dark color.

FIG. 5 is a diagram that may show a 48-point flow table 36. Table 36 may display virtually all or any number of flow curve points, indicating the index number 46 of a point, a voltage 47 with three significant digits after the decimal (i.e., millivolts), and flow 48 in user selected display units (CFM, L/S, M3H). Tolerances, accuracies and units may be other one than indicated. The flow table 36 may be editable so that a user can change each point's voltage and/or flow.

Table columns 46-49 may incorporate one or more points from 1 to 48, Vpot at an x-axis value of the current curve, flow (the header may show the units) at a y-axis value of current curve 42, change 49 in units (shows percent change and absolute change in the units in each flow point after user operations such as curve fit, measured curve fit, upward-downward curve point movements, and so on. An example may be 2.40% (6.97) at point 32.

The following items show basic validation rules that may be applied for a flow table. The data may be numeric only. Flow resolution may be 0.1 (flow unit). Vpot resolution may be 0.001V. A Vpot step may be ≥0.005V. Flow range may be from 0 to 10000 CFM. A flow step may be ≥1 L/s. The resolution, steps and range may be other than those designated.

Figure 6:
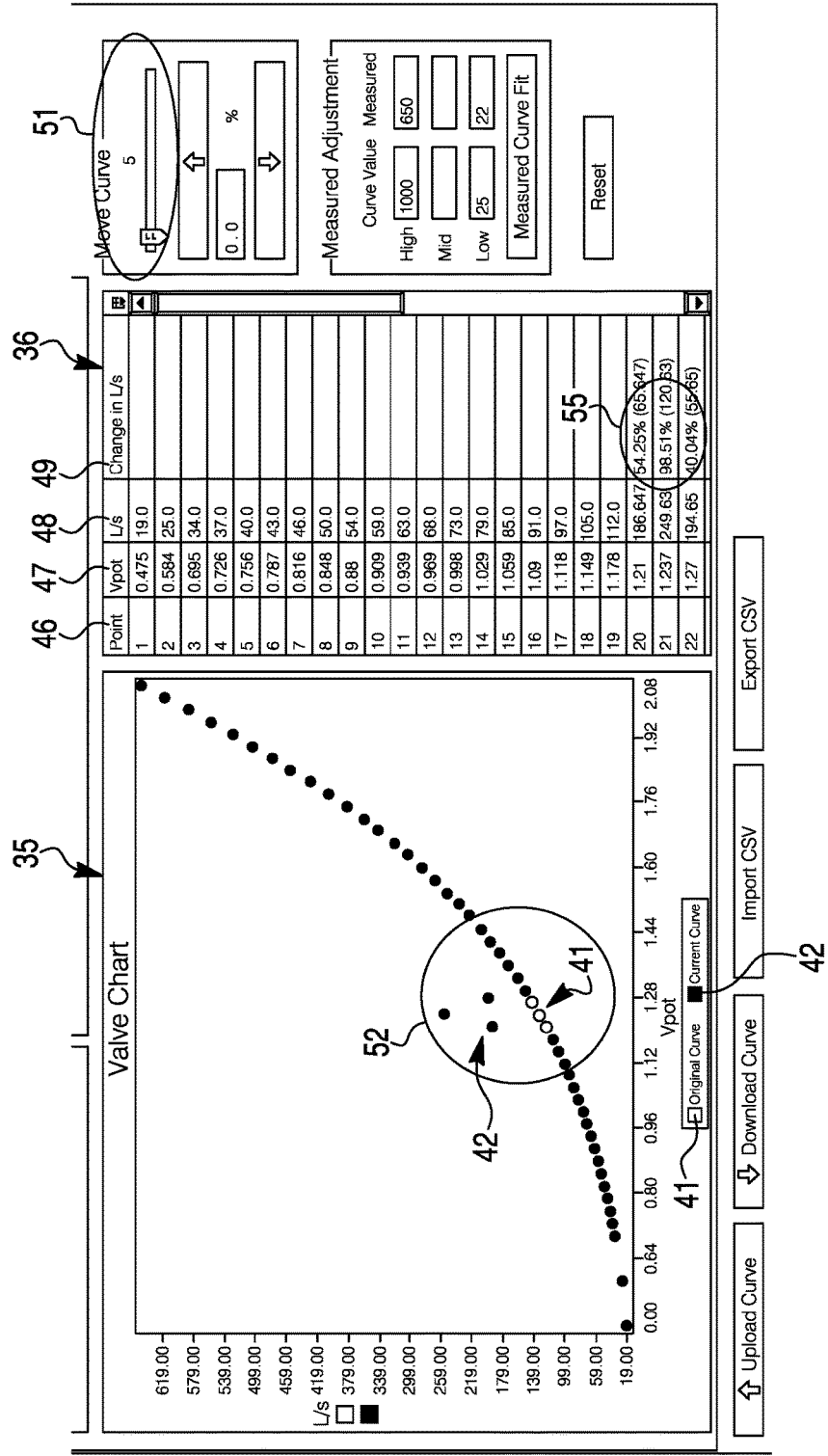
FIG. 6 is a diagram of a screen showing a change of a current curve relative to the original curve.
Figure 7:
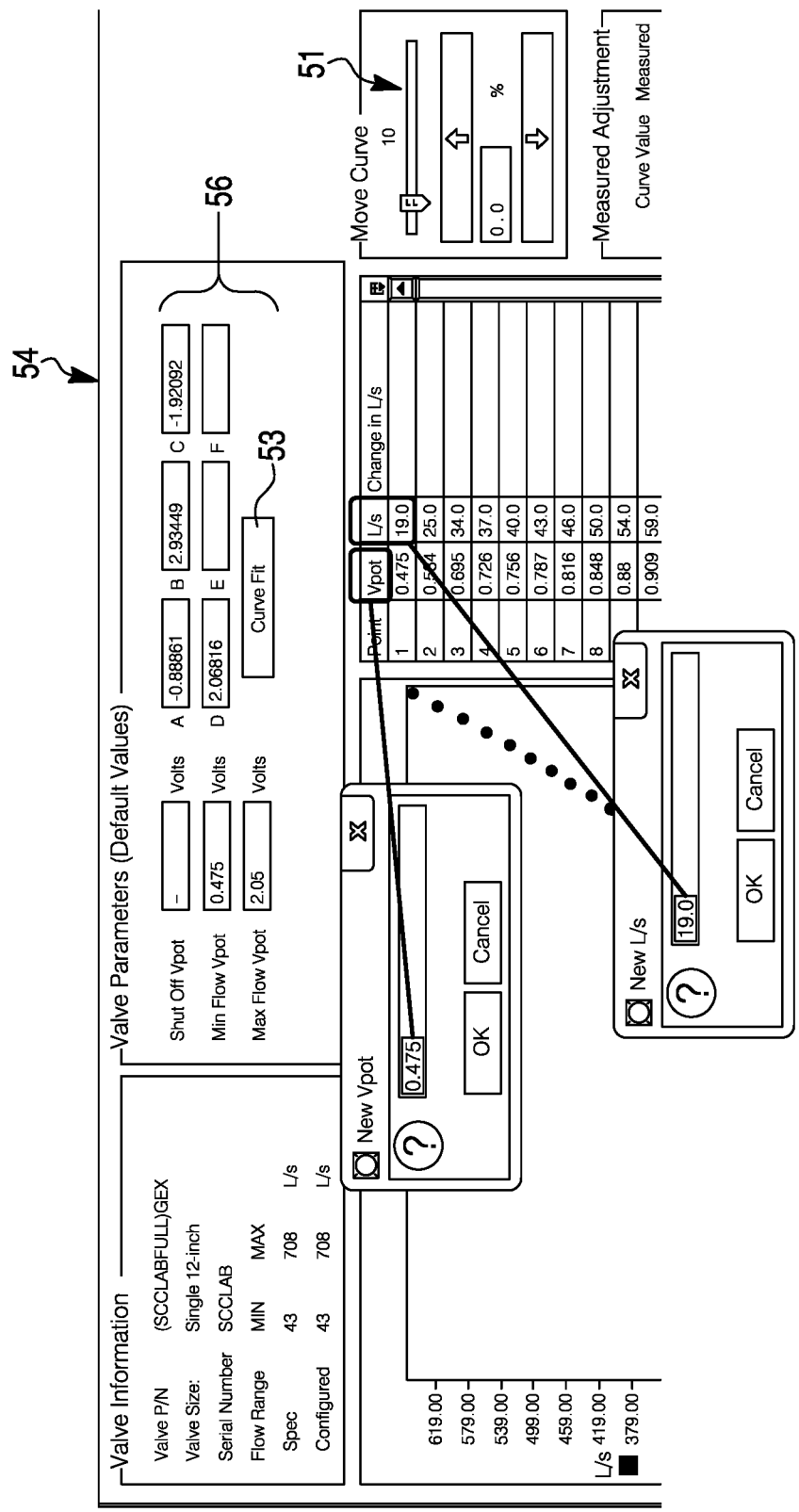
FIG. 7 is a diagram of a screen where after reaching a desired shape of the current curve, new polynomial curve coefficients may be calculated.

There may be several ways to adjust a flow curve in the window or screen 36 of FIG. 6. One may modify flow curve 35 chart by directly dragging part 52 of or whole flow curve 42 up or down. After reaching the desired shape, one may click "Curve Fit" 53 in screen 54 of FIG. 7 to calculate new polynomial curve coefficients 56. Based on the number of points selected (i.e., noted on a "Move Curve" slider 51), the flow may be adjusted and the adjustment can be shown in flow table 36 as a percent change in L/s 49 at area 55 of column 49 in FIG. 6. This approach may be used in combination with modifying flow table 36 values.

One may directly modify the flow values in the flow table 36. After reaching the desired values, one may click "Curve Fit" 53 to calculate new polynomial curve coefficients 56. This approach may be used in combination with modifying the flow curve chart 35.

Figure 8:
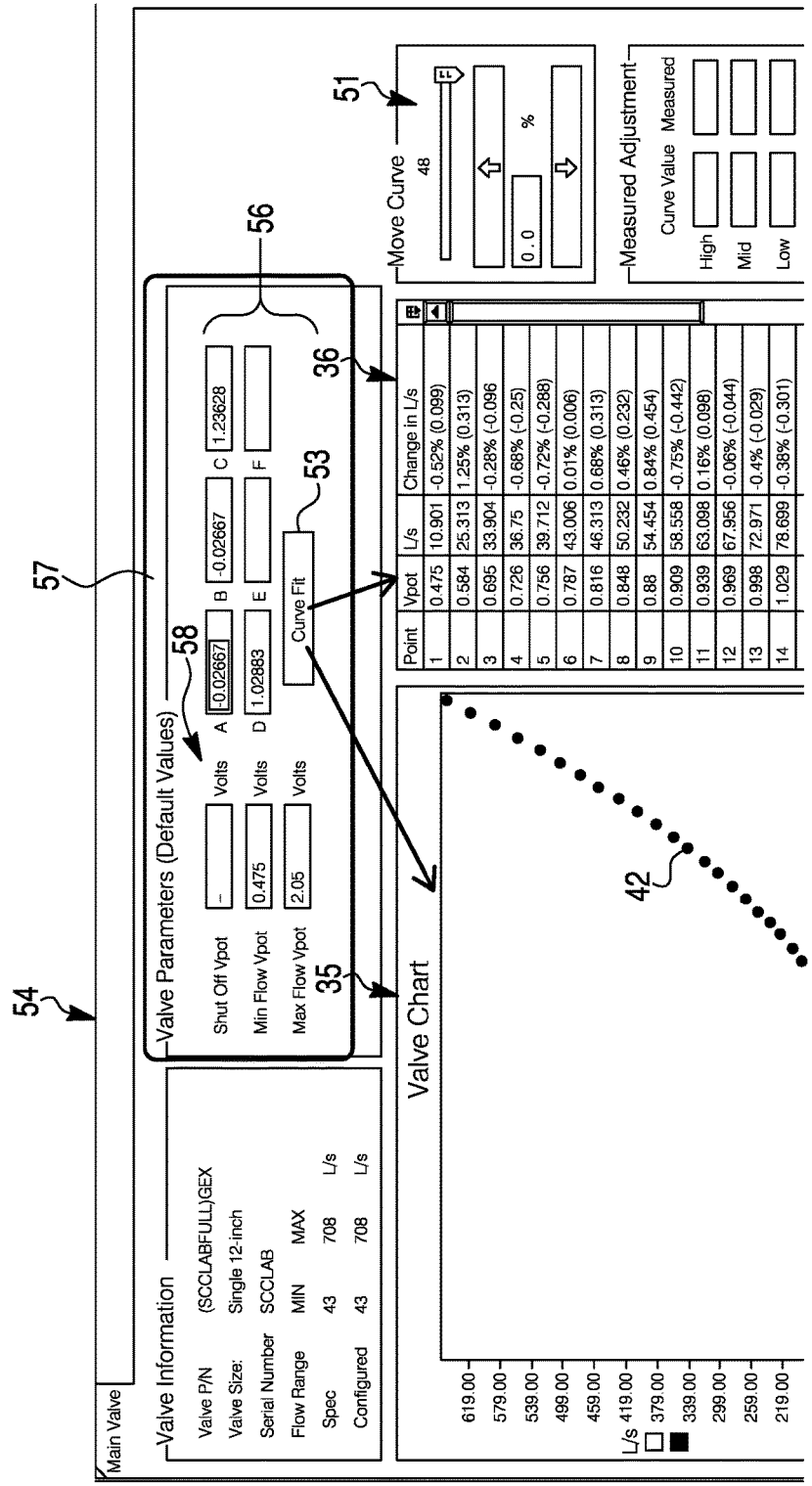
FIG. 8 is a diagram of a screen showing a modification of valve parameters to adjust a flow table and a curve.

The valve parameters 57 of screen 54 of FIG. 8, may be modified. One may directly modify Vpot limit values 58, and polynomial curve coefficients 56, and then click "Update Table" to update flow table 36 and flow curve 42.

Figure 9:
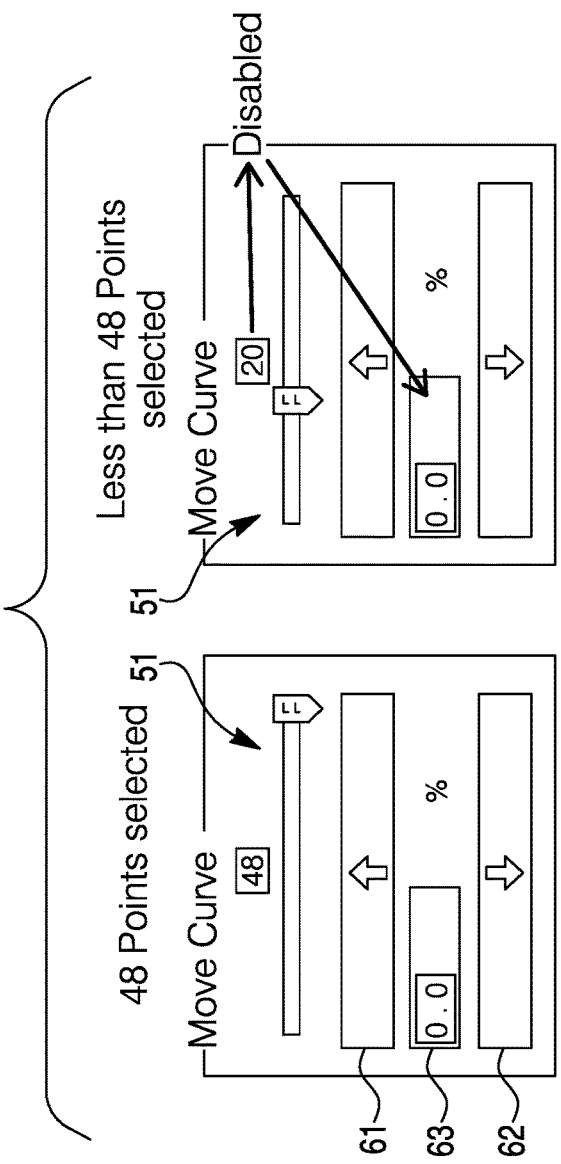
FIG. 9 is a diagram of a screen where a current curve may be adjusted by specifying a percentage of movement of a curve.

One may adjust curve 42 according to a percentage. A user may need to select a number of draggable points (1 to 48). By default, the selection is 48 or the total number of points. An upward button 61 and a downward button 62 may be available only when all 48 points are selected, as shown in a diagram of FIG. 9.

If the user selects 48 points and clicks on upward button 61 or drags any point from curve 42, the then all 48 points may need to be moved upwards by specified percentage as indicated in slot 63, and vice-versa.

Figure 10:
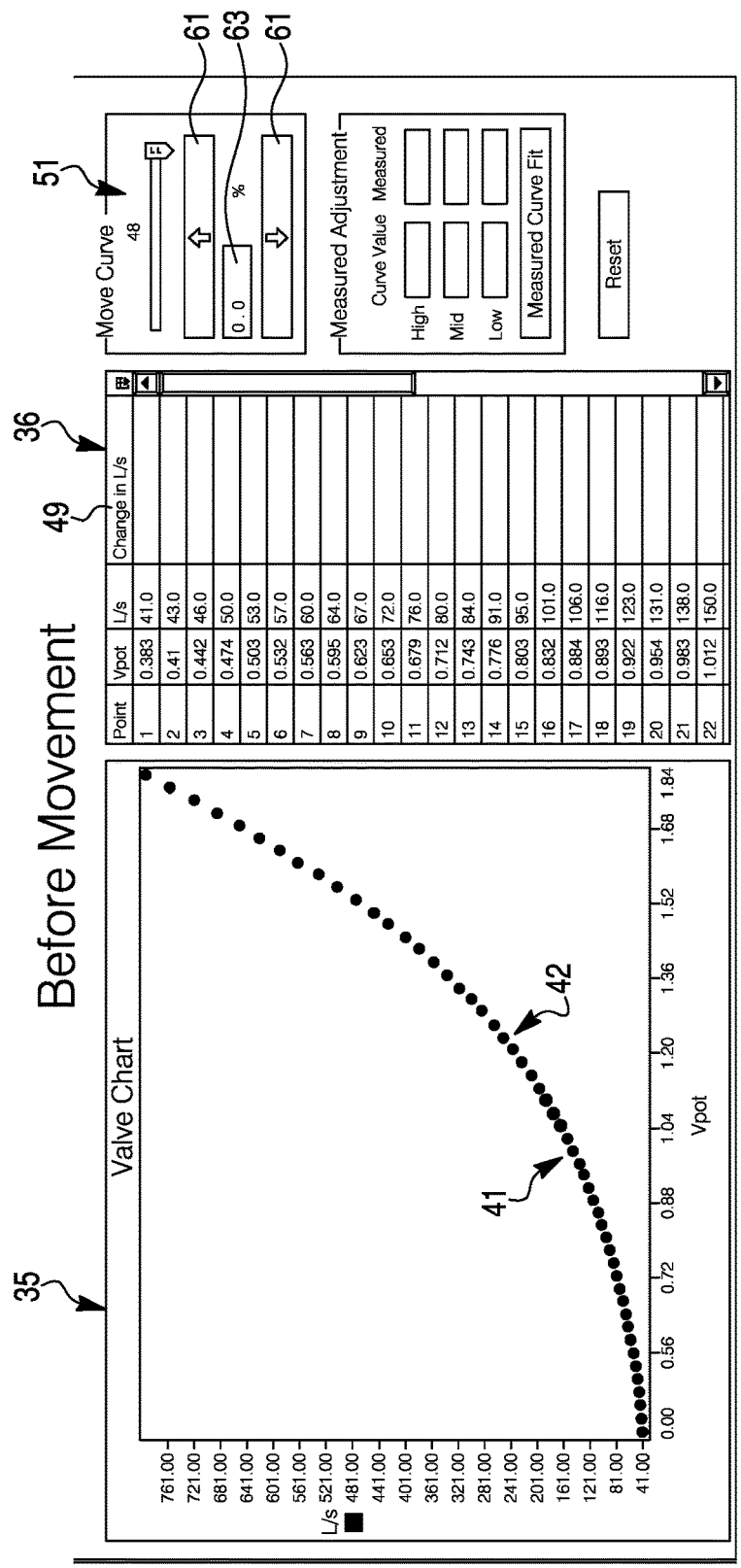
FIG. 10 is a diagram of a screen showing a valve chart and table before movement of all points of a curve.
Figure 11:
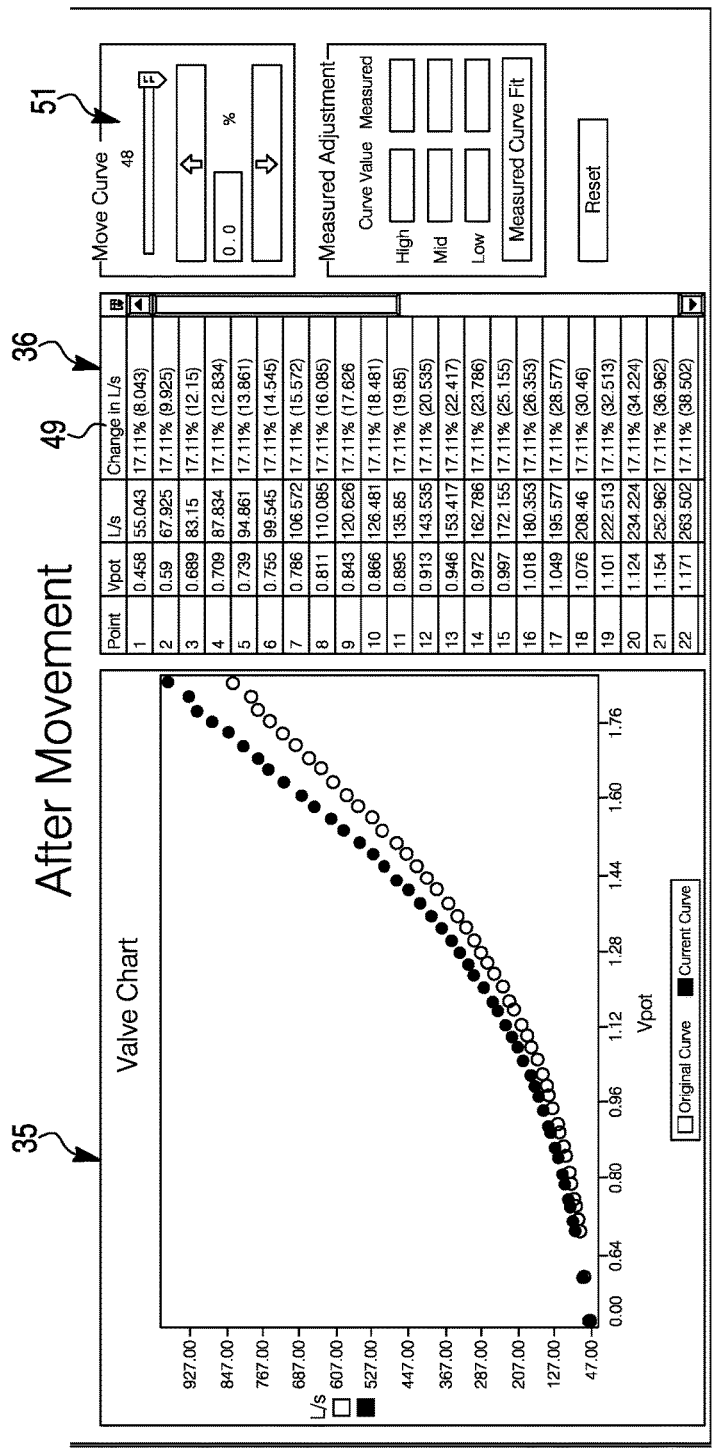
FIG. 11 is a diagram of a screen showing a valve chart and table after movement of all points of a curve.

FIG. 10 is a diagram of valve chart 35 and table 36 before movement of all 48 points. FIG. 11 is a diagram of an upward movement of curve 42 relative to curve 41 in valve chart 35 with a change in L/s as shown in column 49 of table 36.

If the user selects less than 48 points and clicks on an upward button and drags any point from a curve, then the selected point should be moved by flow and other remaining selected points have to be moved in accordance with a linear equation y=mx+c, where y=flow and x=Vpot, and vice-versa.

Figure 12:
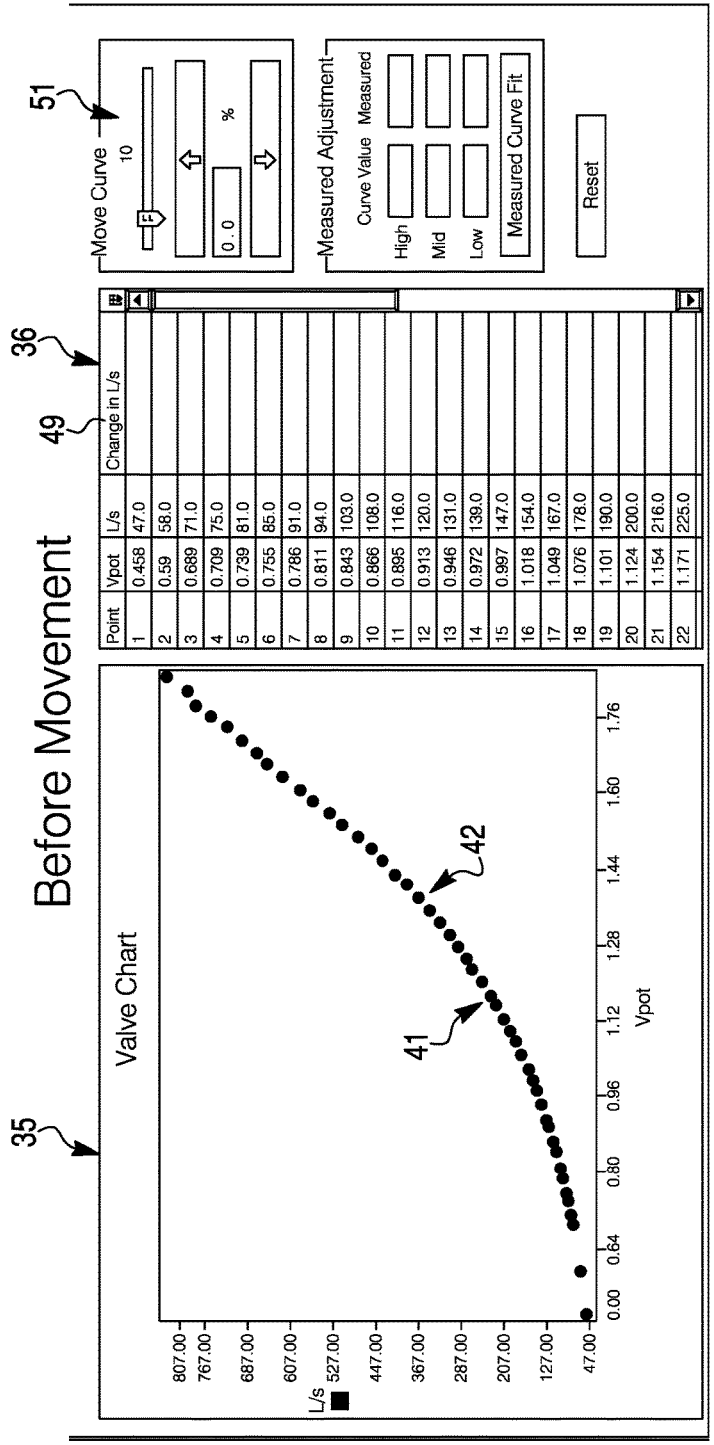
FIG. 12 is a diagram of a screen showing a valve chart and table before movement of less than all points of a curve.
Figure 13:
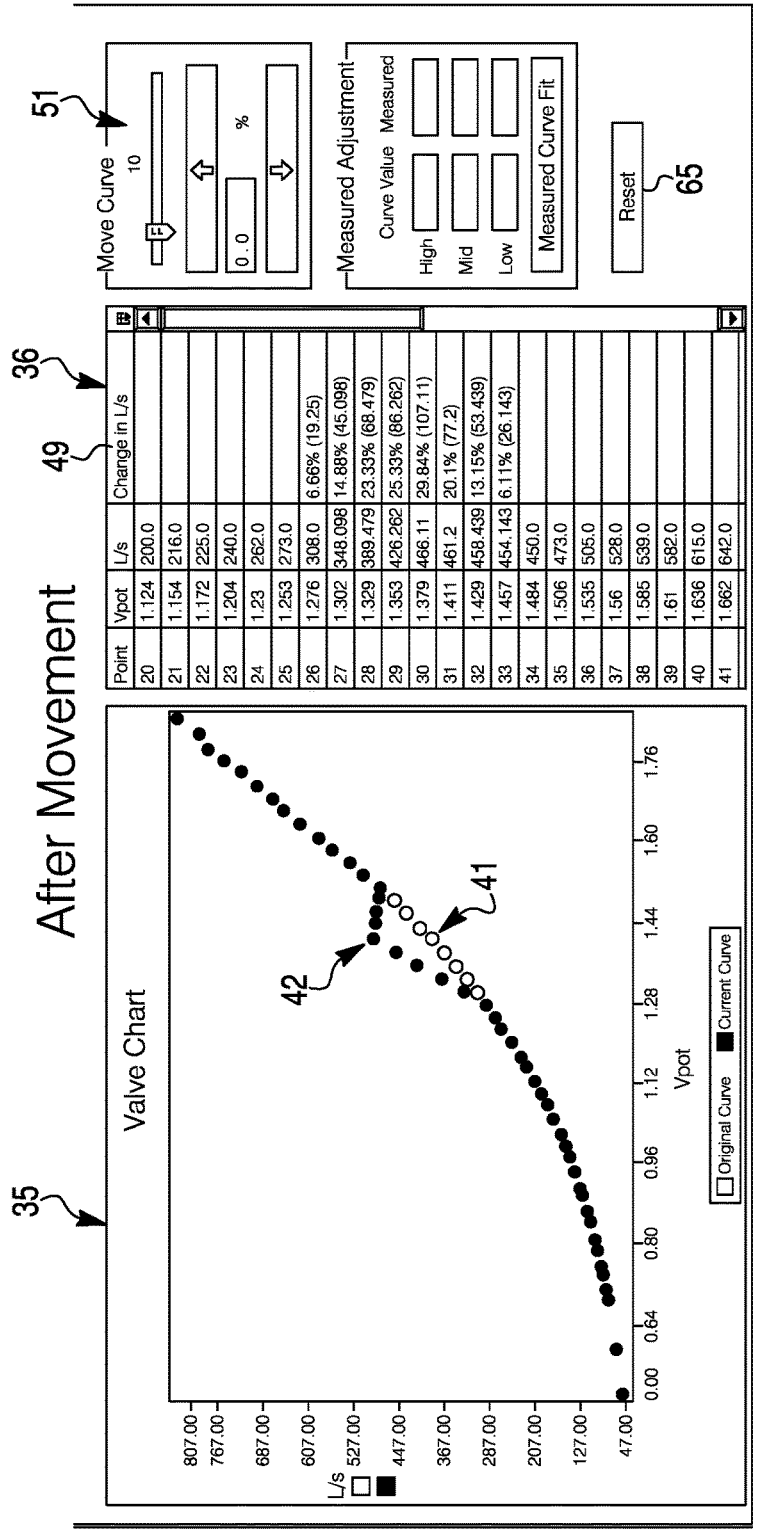
FIG. 13 is a diagram of a screen showing a valve chart and table after movement of less than all points of a curve.

FIG. 12 shows curve 42 relative to curve 41 before movement where less than 48 points are selected. FIG. 13 shows a curve 42 relative to curve 41 after movement where less than 48 points we selected, as shown in valve chart 35 and column 49 of table 36.

Once the necessary curve values are done or set, then valve parameters 58 may be downloaded to the device. If adjusted values are out of range, an error message may be displayed and corrections have to be made before the new curve 42 can be downloaded.

An import flow table may be noted. One may import either a CSV flow table file (e.g., 8-point or 48-point) or a label point VPT flow table file. Clicking the button may display a typical Windows file/open window to execute the import.

An export flow table may be noted. One may export the current 48-point flow table to a CSV file and save the file. A standard Windows File/Save window may be displayed to execute the export.

A curve fit may be noted. One may generate numeric curve coefficients 56 from adjustments made in point flow table 36. Flow table 36 and flow curve chart 35 may be updated with the flow values calculated from new coefficients using an update table button.

A reset 65 may reset the current flow table 36 to the original table 36 uploaded or imported.

Figure 14:
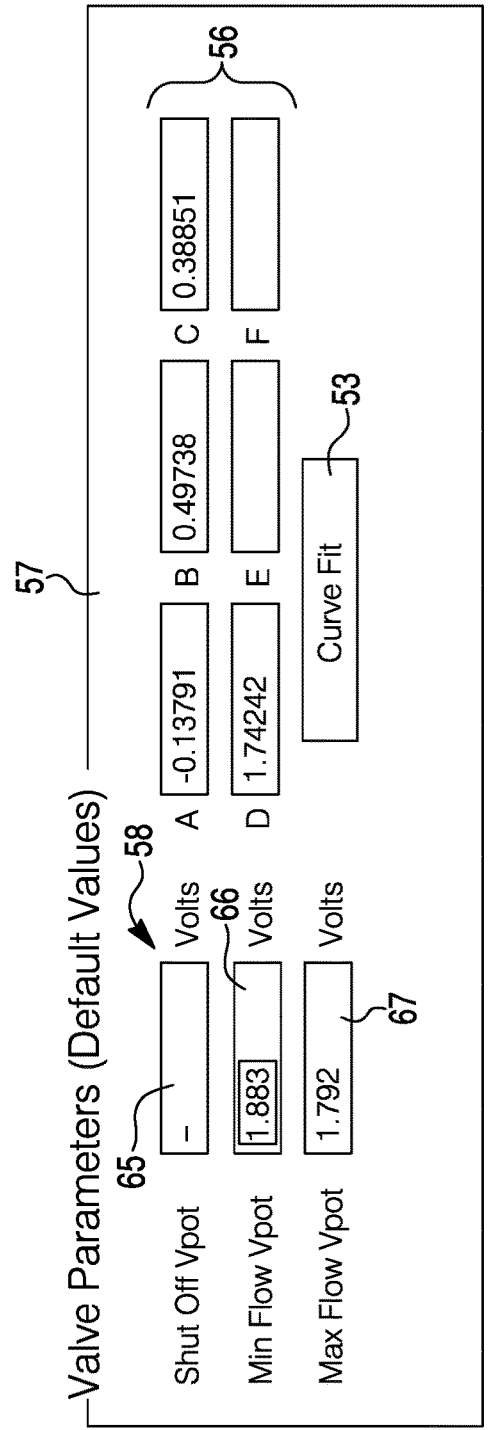
FIG. 14 is a diagram of a screen showing valve parameters in terms of voltage and the various order polynomial coefficients for a curve fit.

Valve parameters 58 may be noted in FIG. 14. Shut Off Vpot at a slot 65 may show a voltage value of the zero flow point, which needs to be the first point in a flow table/flow curve. Min Flow Vpot at a slot 66 may show the voltage value of the first non-zero flow point of the flow table/flow curve. Max Flow Vpot at a slot 67 may show the voltage value of the last flow point of the flow table/flow curve, i.e., a 48th point. A curve fit may calculate 3rd degree best polynomial curve fit parameters based on current flow table 42, and update the flow table/flow curve using calculated values of ABCD, where A is a 5th order polynomial coefficient, B is a 4th order polynomial coefficient, C is a 3rd order polynomial coefficient, D is a 2nd order polynomial coefficient, E is a 1st order polynomial coefficient, and F is a 0th order polynomial coefficient. E and F parameters may be used for a 5th Degree polynomial fit. A 3rd degree best polynomial curve fit equation 71 is shown in FIG. 15.

A curve may be moved. One may use a slider 51 to make curve 42 adjustments or enter a value in a percent (%) text box 63 and click up arrow button 61 or down arrow button 62 to make an increase/decrease curve change.

Figure 16:
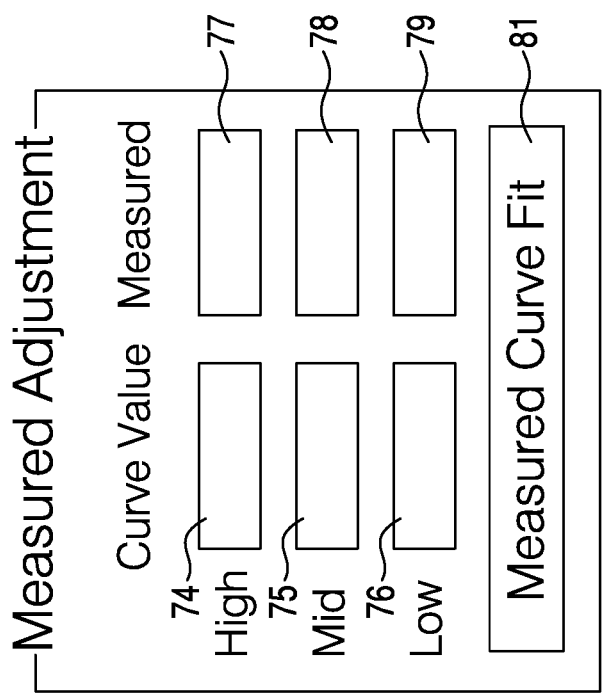
FIG. 16 is a diagram of a screen showing a measured adjustment relating to fields that may compare high, mid and low values in the current curve against corresponding actual values measured and read at the valve.

A measured adjustment may be noted in FIG. 16. The fields may compare the High, Mid, Low values 74-76 in curve 42 against corresponding actual values 77-79 measured and read at the valve. A user should be able to enter up to three original vs. measured flow values and generate a new flow curve 42 that closely matches three measured flow values 77-79. Original values may be the ones reported by LVC, and they are not necessarily in actual flow table 36. A measured "Curve Fit" button 81, when clicked, may process the input flow value pair, and generate a new curve 42 and table 36.

In a measured curve fit operation, when a user clicks button 81 "Measured Curve Fit", and input data are validated, a program may perform the following operation (using three pairs as an example). One may reverse calculate the Vpot values (V1, V2, V3) of slots 74-76 from an original flow value (OrgFlow1, OrgFlow2, OrgFlow3). The calculation may be done by linear interpolation. Three new Vpot and measured flow pairs may be added to the flow table. Now the 48-point flow table 36 may become a 51-point table. A curve fit algorithm may be run to obtain ABCD coefficients, and update 48-point flow table 36, update the curve 42 and table 36. Three new flow values may be calculated at the three Vpot (V1, V2, V3) slots 74-76 and the error percentages may be calculated against a measured flow of values at slots 77-79.

To recap, a control device optimization system may incorporate a controller, and one or more valves for airflow control in a space, connected to the controller. The controller may incorporate a user interface. The user interface may incorporate a display and a control mechanism. The controller may have one or more airflow tables corresponding to the one or more valves, respectively. The controller may have a curve tool that can provide an airflow table on the display in one or more formats. The one or more formats may be selected from a group incorporating grids and graphs.

A grid may show values that range from a lowest flow setting to a highest flow setting for a selected valve. The values may be uploaded from a valve or from a file. The grid may be shown on the display.

The graph may be a plot of values of an airflow table. The plot may be an airflow curve shown in the display.

A user may upload a file to test an airflow table with different settings on a valve.

If the values are uploaded from a valve, then an N number of values may be displayed. If the values are uploaded from a file, then a number of values displayed may be equal to or less than N. If the number of values uploaded from the file is less than N and the values are calibrated to N, then the numbers of values may be interpolated to N because the number of values of the airflow table should match N so that the one or more valves corresponding to the airflow table work according to the values.

If a valve is online, then N values may be uploaded from the valve.

Values for a valve may be uploaded from a file.

The display may show a graph of airflow curves for a valve. Airflow curves may reveal values of flow on a Y-axis and Vpot on an X-axis. The airflow curves may incorporate an original curve and a current curve. The original curve may be uploaded from the valve or from a file, and remain unchanged and show an original state of the curve. The current curve may be equal to the original curve when uploaded from the valve or the file but may show a current position of values after being subjected to one or more operations selected from a group incorporating curve fits, measured curve fits, upward-downward curve point movements, and shifts of the current curve or portions of the current curve.

Values of the original curve may be plotted with a first type of symbols. Values of the current curve may be plotted with a second type of symbols.

A grid of a valve may incorporate a column of points, column of X-axis values of the current curve, a column of a Y-axis values of the current curve, and a column of relative change and/or absolute change of values of the current curve relative to the original curve after being subjected to the one or more operations. One or more values of one or more columns of the grid of a valve may be modified. A resulting curve due to changes of values in the grid may occur and a fit of the current curve may be calculated with polynomial curve coefficients.

A part or whole of the current curve may be dragged up or down to a desired shape. A fit of the current curve may be calculated with polynomial curve coefficients.

The changes of values in the grid may be downloaded to a respective valve.

The current flow table may be exported and saved as a file.

The current flow table may be reset to the original table uploaded or imported.

Up to three original values against actual measured flow values measured at a valve can be entered. A new flow curve and/or grid may be generated that virtually matches the three measured flow values.

The controller may use a Tridium™ Niagara$^{AX}$™ framework as a base application for the airflow control in a space.

An approach for control device optimization may incorporate connecting one or valves for airflow control in a space to a controller; entering one or more airflow tables having data corresponding to one or more valves for airflow control in a space, into the controller; and using a curve tool from the controller to provide an airflow table in one or more formats on a display. The display may show in the one or more formats airflow curves for a valve. The airflow curves may incorporate an original curve and a current curve. The original curve may be uploaded from the valve or from a file, remain unchanged, and show an original state of a curve. The current curve may be equal to the original curve when uploaded from the valve or the file but may show a current position of values after being subjected to one or more operations selected from a group incorporating curve fits, measured curve fits, and upward-downward curve point movements.

A part or whole of the current curve may be dragged up or down to a desired shape or changed in another manner. The current curve may be compared with the original curve in terms of differences that appear between corresponding values of the curves.

A monitoring mechanism of airflow in a space, may incorporate one or more valves that can control airflow in a space, and a controller connected to the one or more valves. The controller may incorporate a display. Data corresponding to the one or more valves may be uploaded from the one or more valves or a file that receives information from the one or more valves. A curve tool may develop one or more original and current airflow curves for the one or more valves from the data. The one or more original and current airflow curves may be presentable on the display. An original curve may be unchangeable after an initial development of the original curve by the curve tool from the data. A current curve may be changeable during development of the current curve after an initial development of the current curve from the data.

The current curve may be equivalent to the original curve at initial development but may show a current position of values after being subjected to one or more operations selected from a group incorporating changes of the data, curve fits, measured curve fits, upward-downward curve point movements, and shifts of the current curve or portions of the current curve shown on the display.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A control device for calibrating airflow for one or more airflow valves having a plurality of settings and one or more sensors to detect airflow through the one or more airflow valves; the device comprising:
    a user interface comprising a display and a control mechanism; and
    a controller operatively coupled to the user interface and the one or more sensors and including an adjustment tool configured to:
        receive airflow amounts through the one or more airflow valves at each of the plurality of settings from the one or more sensors or from a test file for the one or more airflow valves;
        process the airflow amounts to obtain a plurality of values indicating the airflow amounts through the one or more airflow valves;
        update an airflow table with the plurality of values; and
        produce an airflow curve, using the updated airflow table, that displays the airflow through the one or more airflow valves at each of the plurality of settings; and
    wherein the controller is configured to generate the airflow table and the airflow curve on the display and allow a user to adjust the plurality of values in the airflow table and adjust the airflow curve via the control mechanism to adjust the airflow through the one or more valves.

2. The control device of claim 1, wherein the adjustment tool includes an operating range for each of the plurality of settings and the controller is configured to generate an error message on the display when adjustments to the plurality of values in the airflow table and adjustments to the airflow curve place any of the plurality of settings outside its corresponding range.

3. The control device of claim 1, wherein the airflow amounts can be received from the test file when the one or more airflow valves are offline.

4. The control device of claim 3, wherein a number of the airflow amounts received from the test file is less than a number of the airflow amounts received from the one or more sensors.

5. The control device of claim 4, wherein the number of the airflow amounts received from the one or more sensors is forty-eight.

6. The control device of claim 5, wherein the amounts received from the test file are interpolated to fully update the airflow table.

7. The control device of claim 1, wherein:
    the airflow curve reveals values of flow on a Y-axis and Vpot on an X-axis;
    the airflow curve comprises an original curve and a current curve;
    the original curve is uploaded from the valve or from a file, and remains unchanged and shows an original state of the curve;
    the current curve shows a current position of values after the original curve is subjected to one or more operations selected from a group comprising curve fits, measured curve fits, upward-downward curve point movements, and shifts of the current curve or portions of the current curve; and Vpot is a valve potentiometer signal representing a valve flow.

8. The control device of claim 7, wherein:
values of the original curve are plotted with a first type of symbols; and
values of the current curve are plotted with a second type of symbols.

9. The control device of claim 7, wherein:
a grid of a valve comprises a column of points, column of X-axis values of the current curve, a column of a Y-axis values of the current curve, and a column of relative change and/or absolute change of values of the current curve relative to the original curve after being subjected to the one or more operations;
one or more values of one or more columns of the grid of a valve can be modified; and
a resulting curve due to changes of values in the grid can occur and a fit of the current curve can be calculated with polynomial curve coefficients.

10. The control device of claim 7, wherein:
a part or whole of the current curve can be dragged up or down to a desired shape; and
a fit of the current curve can be calculated with polynomial curve coefficients.

11. The control device of claim 9, wherein the changes of values in the grid are downloaded to a respective valve.

12. The control device of claim 9, wherein the current flow table can be exported and saved as a file.

13. The control device of claim 7, wherein the current flow table can be reset to the original table uploaded or imported.

14. The control device of claim 7, wherein:
up to three original values against actual measured flow values measured at a valve can be entered; and
a new flow curve and/or grid can be generated that virtually matches the three measured flow values.

15. The control device system of claim 1, wherein a number of the airflow amounts received from the one or more sensors is forty-eight.

16. A method for calibrating airflow for one or more airflow valves having a plurality of settings and one or more sensors to detect airflow through the one or more airflow valves; the method comprising:
receiving airflow amounts through the one or more airflow valves at each of the plurality of settings from the one or more sensors;
processing the airflow amounts to obtain a plurality of values indicating the airflow amounts through the one or more airflow valves;
updating an airflow table with the plurality of values; and
producing an airflow curve, using the updated airflow table, that displays the airflow in through the one or more airflow valves at each of the plurality of settings;
adjust the airflow curve based on user adjustment of the plurality of values and of the airflow curve; and
display an error message when the adjustment of the plurality values and the airflow curve places any of the plurality of settings outside an operating range;
wherein:
the airflow curve comprises an original curve and a current curve;
the original curve is uploaded from the one or more valves or from a file, and remains unchanged and shows an original state of a curve; and
the current curve is equal to the original curve when uploaded from the one or more valves or the file but shows a current position of values after being subjected to one or more operations selected from a group comprising curve fits, measured curve fits, and upward-downward curve point movements.

17. The method of claim 16, wherein:
a part or whole of the current curve can be dragged up or down to a desired shape or changed in another manner; and
the current curve can be compared with the original curve in terms of differences that appear between corresponding values of the curves.

18. An airflow calibration system, comprising:
one or more airflow valves having a plurality of settings that can control airflow in a space; one or more sensors operatively coupled to the one or more airflow valves and configured to detect airflow through the one or more airflow valves;
a user interface comprising a display and a control mechanism; and
a controller operatively coupled to the user interface and the one or more sensors and including an adjustment tool configured to:
receive airflow amounts through the one or more airflow valves at each of the plurality of settings from the one or more sensors or from a test file for the one or more airflow valves;
process the airflow amounts to obtain a plurality of values indicating the airflow amounts through the one or more airflow valves;
update an airflow table with the plurality of values; and
produce an airflow curve, using the updated airflow table, that displays the airflow through the one or more airflow valves at each of the plurality of settings;
wherein the controller is configured to generate the airflow table and the airflow curve on the display and allow a user to adjust the plurality of values in the airflow table and adjust the airflow curve via the control mechanism to adjust the airflow through the one or more valves.

19. The system of claim 18, wherein the adjustment tool includes an operating range for each of the plurality of settings and the controller is configured to generate an error message on the display when adjustments to the plurality of values in the airflow table and adjustments to the airflow curve place any of the plurality of settings outside its corresponding range.

* * * * *